United States Patent

[11] 3,559,659

| [72] | Inventor | Harry K. Gougoulas<br>1875 Philomine, Lincoln Park, Mich. 48451 |
|---|---|---|
| [21] | Appl. No. | 749,125 |
| [22] | Filed | July 31, 1968 |
| [45] | Patented | Feb. 2, 1971 |

[54] VEHICLE CLEANING APPARATUS
34 Claims, 11 Drawing Figs.

[52] U.S. Cl.................................................... 134/45, 134/181
[51] Int. Cl..................................................... B60s 3/04
[50] Field of Search........................................... 134/45, 123, 180, 181; 15/(CCP digest)

[56] References Cited
UNITED STATES PATENTS

| 1,942,653 | 1/1934 | Kiggins.......................... | 15/(CCP) |
| 3,187,359 | 6/1965 | Takeuchi....................... | 134/123X |
| 3,196,888 | 7/1965 | Rousseau ....................... | 134/45 |
| 3,288,109 | 11/1966 | Smith, Jr. et al. .............. | 134/123X |
| 3,349,783 | 10/1967 | Ellis............................... | 134/45 |
| 3,421,169 | 1/1969 | Hergonson..................... | 134/45X |
| 3,431,580 | 3/1969 | Cirino et al.................... | 134/234X |
| 3,432,346 | 3/1969 | Hurst............................. | 134/123X |

OTHER REFERENCES
KEM-WASH, AUTO LAUNDRY NEWS, Vol. 14, No. 10, Oct. 1965, p. 30.

*Primary Examiner*—Robert L. Bleutge
*Attorney*—Barnard, McGlynn and Reising

ABSTRACT: Vehicle cleaning apparatus including a selectively operable nozzle adapted to provide a high-pressure stream of cleaning fluid to a vehicle's outer surface and a motor for oscillating said nozzle in a longitudinal direction with respect to the vehicle. The nozzle apparatus takes several forms including a nozzle pivotally supported overhead but movable rectilinearly with respect to the longitudinal axis of the vehicle. In another form a plurality of nozzles are pivotally supported overhead of a vehicle, the support being movable rectilinearly with respect to the longitudinal axis of the vehicle so as to provide a high-pressure cleaning fluid spray to all portions of the top of the vehicle.

PATENTED FEB 2 1971     3,559,659

INVENTOR.
Harry K. Gougoulas
BY
Bernard, McGlynn & Reising
ATTORNEYS

INVENTOR.
Harry K. Gougoulas

PATENTED FEB 2 1971

INVENTOR.
Harry K. Gougoulas
BY
Barnard, McGlynn & Reising
ATTORNEYS

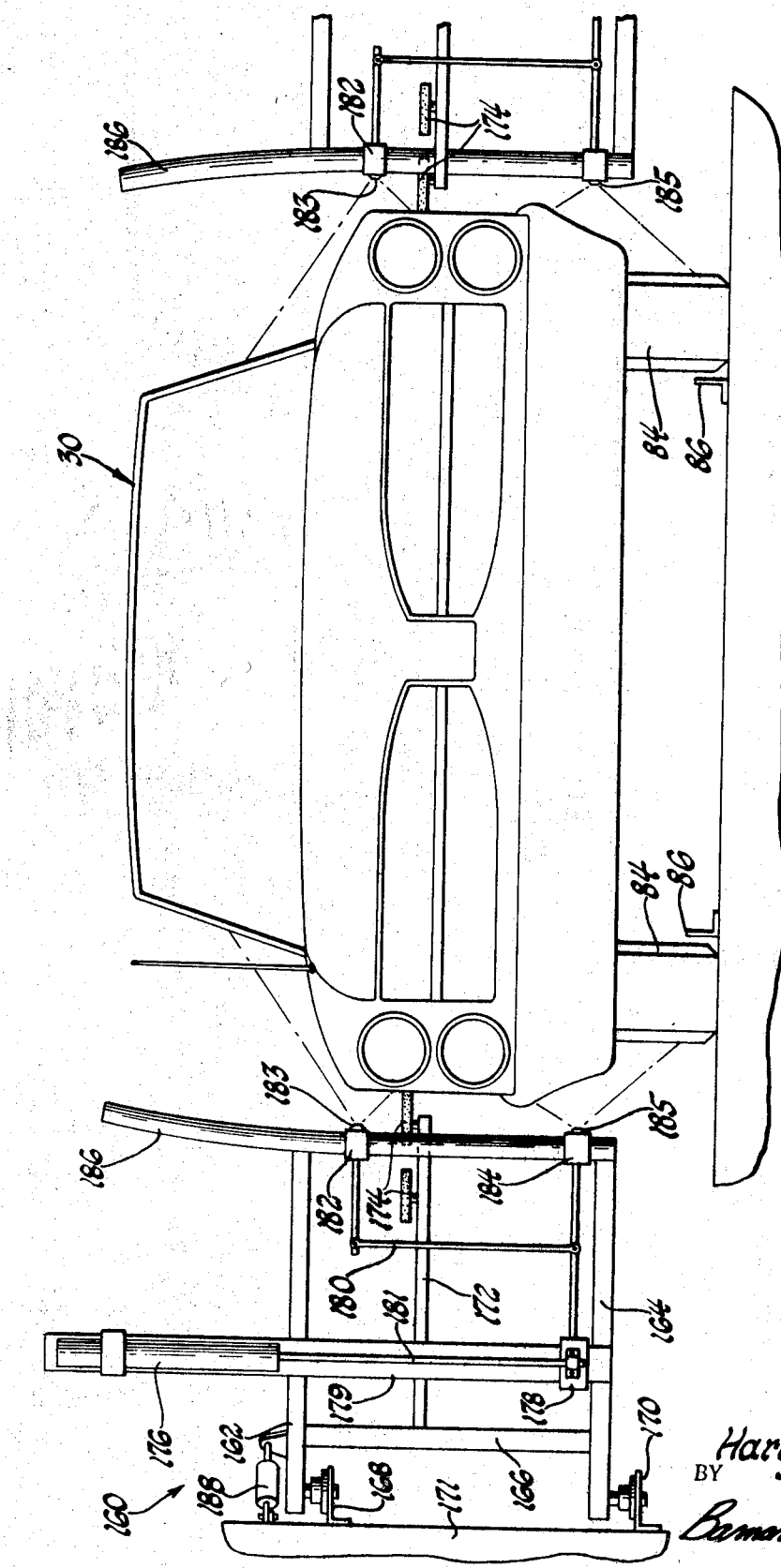

VEHICLE CLEANING APPARATUS

This invention relates to cleaning apparatus and more particularly to vehicle cleaning apparatus wherein at least one spray nozzle is movable transversely of the vehicle and pivotable with respect thereto in order to provide a high-pressure stream of cleaning fluid to a vehicle's outer surface including areas that are normally inaccessible to vehicle cleaning apparatus.

In vehicle cleaning apparatus of the type normally found in semiautomatic car washes, it is desirable that a mixture of water and detergent be sprayed onto a vehicle's surface under high pressure so that the initial fluid stream dislodges loosely held dirt and sediment while providing the surface of the vehicle with a thin film of detergent for use by apparatus to contact the vehicle later. It is also desirable in car wash type apparatus to present the high-pressure stream of fluid to the surface of the vehicle from a distance that is rather small so as to maximize the benefit of the high pressure. Finally, a very important attribute of acceptable vehicle cleaning apparatus is that the high pressure be directed at all surfaces of the vehicle that are likely to have a buildup of dirt and sediment thereon. More specifically, the rocker panels and the underside of the rear bumper of the vehicle are generally the surfaces that have the greatest accumulation of sediment and, therefore, it is desirable that effective vehicle cleaning apparatus have high-pressure fluid directed on these surfaces for a longer period of time than the stream directed to other portions of the vehicle. Additionally, the lower front portion of the vehicle accumulates an amount of dirt and sediment that almost equals the amount collected at the lower rear portion of the vehicle, so it is desirable that the lower front portion of the vehicle be adequately cleaned. Within the framework of the requirements hereinbefore set forth, it is finally desirable that a high-pressure stream of cleaning fluid be applied to the surface of the vehicle from a distance proximate thereto so that such vehicle washing apparatus, as hereinbefore described, requires that the source of the stream of high-pressure follow the contour of the vehicle thereby assuring that all surfaces thereof have approximately the same amount of fluid under pressure directed thereto, with troublesome areas even more thoroughly cleaned.

The prior art devices have recognized the aforementioned requirements of car washing apparatus but have not been directly responsive to the requirements in a single device. For example, certain prior art devices provide an oscillating arm which directs fluid under pressure to various surfaces of the vehicle but makes no provision for directing a fluid under a higher pressure or for a greater period of time to the surfaces of the vehicle that are more likely to accumulate dirt and sediment. Other prior art devices have provided rather elaborate arrangements for directing high-pressure fluid to the surface of the vehicle but are so complex as to be unreasonably expensive. In some cases these devices provide typical spray patterns on the surface that, because of the great number of openings in the nozzles necessarily operate under a lower pressure with respect to the fluid actually contacting the vehicle's surface for a given pump capacity. This necessarily diminishes the effectiveness of the high-pressure fluid and, consequently, adversely affects the resulting cleaning action.

Other prior art devices have responded to the aforementioned problems by providing high-pressure fluid located in proximity to the surface of the vehicle but attempt to accomplish a washing of more of the vehicle's surface than is reasonable with the devices taught so that the effectiveness of the washing action is necessarily limited. These devices are exemplified by the type in which a rail is provided that completely encompasses the outer periphery of the vehicle and a spray nozzle traverses the rail to direct a high-pressure fluid to the surface of the vehicle. The rail does not closely follow the vehicle contour, so this necessarily diminishes the effectiveness of the fluid's effect in certain areas.

In contrast to the prior art devices, the present invention contemplates a solution to the aforementioned problems by providing vehicle cleaning apparatus comprising first means adapted to provide a high-pressure stream of cleaning fluid to a vehicle's outer surface, second means for oscillating the first means transversely with respect to the longitudinal axis of the vehicle, and third means for moving the second means rectilinearly in a longitudinal direction with respect to the vehicle. Therefore, the present invention satisfies the shortcomings of the prior art by providing a high pressure stream of cleaning fluid that is oscillated transversely to the longitudinal axis for the direction the car travels through the car wash and provides yet third means for moving the oscillating means in a straight line parallel to the longitudinal axis of the vehicle so that there is sufficient time available as the vehicle moves through the car wash to direct the high-pressure stream of cleaning fluid to selected areas of the vehicle's outer surface for a longer period of time thereby driving dirt and sediment therefrom. The present invention also provides vehicle cleaning apparatus comprising first means adapted to provide a high-pressure stream of cleaning fluid to a vehicle's outer surface; second means suspended above the vehicle for oscillating the first means laterally or transversely with respect to the vehicle, and third means for moving second means in a manner following the vehicle after the vehicle has passed the second means which is stationary. In this manner, the under rear side of the vehicle is washed for a longer period of time than the other areas of the vehicle thereby insuring that the dirt and sediment that will inevitably accumulate on such surfaces is subjected to a high-pressure stream of cleaning fluid for a longer period of time than other surfaces of the vehicle. Additionally, the present invention includes similar means for washing the sides of a vehicle.

Accordingly, it is an object of the present invention to provide improved vehicle cleaning apparatus comprising means adapted to provide a high-pressure stream of cleaning fluid to a vehicle's outer surface, means for oscillating the aforementioned means transversely with respect to the longitudinal axis of the vehicle, and finally means for moving the aforementioned means rectilinearly in a longitudinal direction with respect to the vehicle.

It is another object of the present invention to provide improved vehicle cleaning apparatus according to the previous object wherein the second mentioned means includes a trolley.

It is still another object of the present invention to provide improved vehicle cleaning apparatus presenting a high-pressure stream of cleaning fluid to a vehicle's outer surface, means for oscillating the stream of cleaning fluid transversely with respect to the longitudinal axis of the vehicle, and means for moving the oscillating stream rectilinearly and parallel with the longitudinal axis of the vehicle which also provides means for sensing the configuration of the vehicle so that the high-pressure stream of cleaning fluid will always be presented to the vehicle's surface from a close distance.

It is a further object of the present invention to provide an improved vehicle cleaning apparatus comprising first means adapted to provide a high-pressure stream of cleaning fluid to a vehicle's outer surface, second means suspended above the vehicle for oscillating the first means transversely with respect to the vehicle, and third means for moving the second means in a manner following the vehicle after the vehicle has passed the second means.

It is still a further object of the present invention to provide improved vehicle cleaning apparatus according to the previous object wherein the second means includes an arm extending toward the vehicle with wheels carried thereon for contacting the vehicle's outer surface to sense the shape of the outer contour thereof.

It is yet a further object of the present invention to provide improved vehicle cleaning apparatus wherein means are provided to sense the side contour of a vehicle and present a high-pressure fluid stream thereto.

Other objects and attendant advantages of the present invention will be readily appreciated as the same becomes better understood by reference to the following detailed description when considered in connection with the accompanying drawings wherein:

FIG. 11 is a view in elevation of a form of the present invention for cleaning the side of a vehicle.

Figure 1:
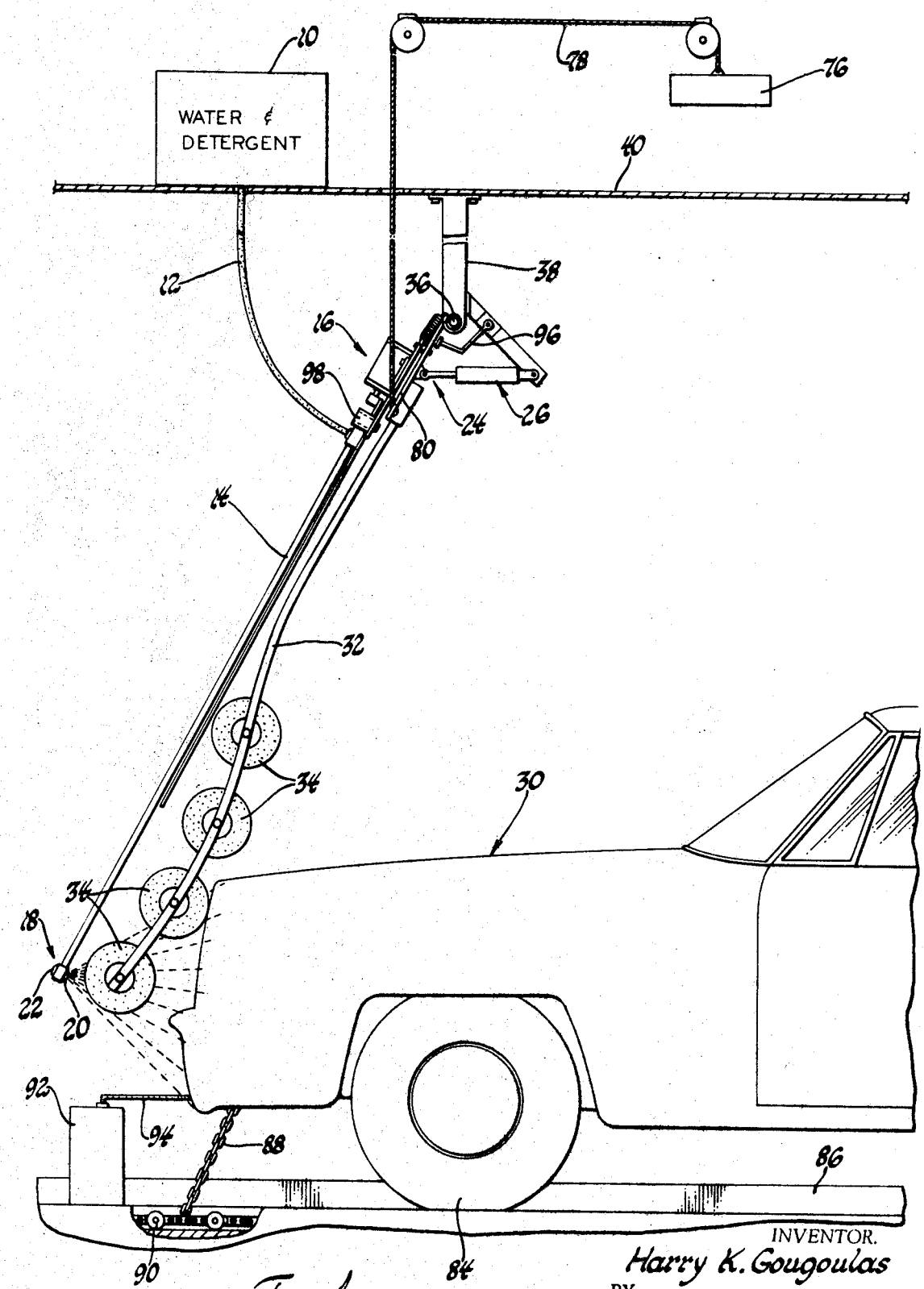
FIG. 1 is a view in elevation of one embodiment of the present invention including a side spray arrangement.
Figure 6:
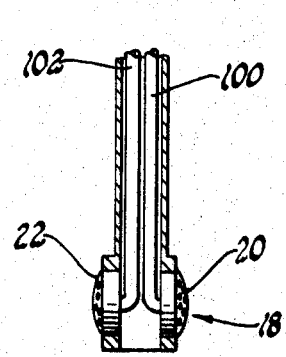
FIG. 6 is a sectional view of the nozzle arrangement of the present invention.
Figure 5:
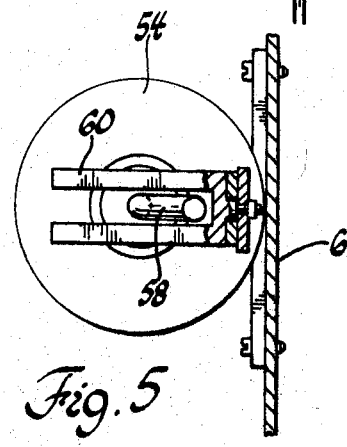
FIG. 5 is a sectional view taken along line 5–5 of FIG. 4.

Referring to FIG. 1, a water and detergent reservoir 10 supplies a mixture of water and detergent through line 12 to oscillating arm 14. Arm 14 is oscillated transversely of the longitudinal axis of a vehicle by means generally indicated by numeral 16 which is rotatable and includes a crank mechanism operating in a manner to be hereinafter described. A spray device, generally shown at 18 and more clearly shown in FIG. 6, includes a first nozzle means 20 directed rearwardly toward a moving vehicle and a second nozzle means 22 directed forwardly toward the moving vehicle.

Figure 2:
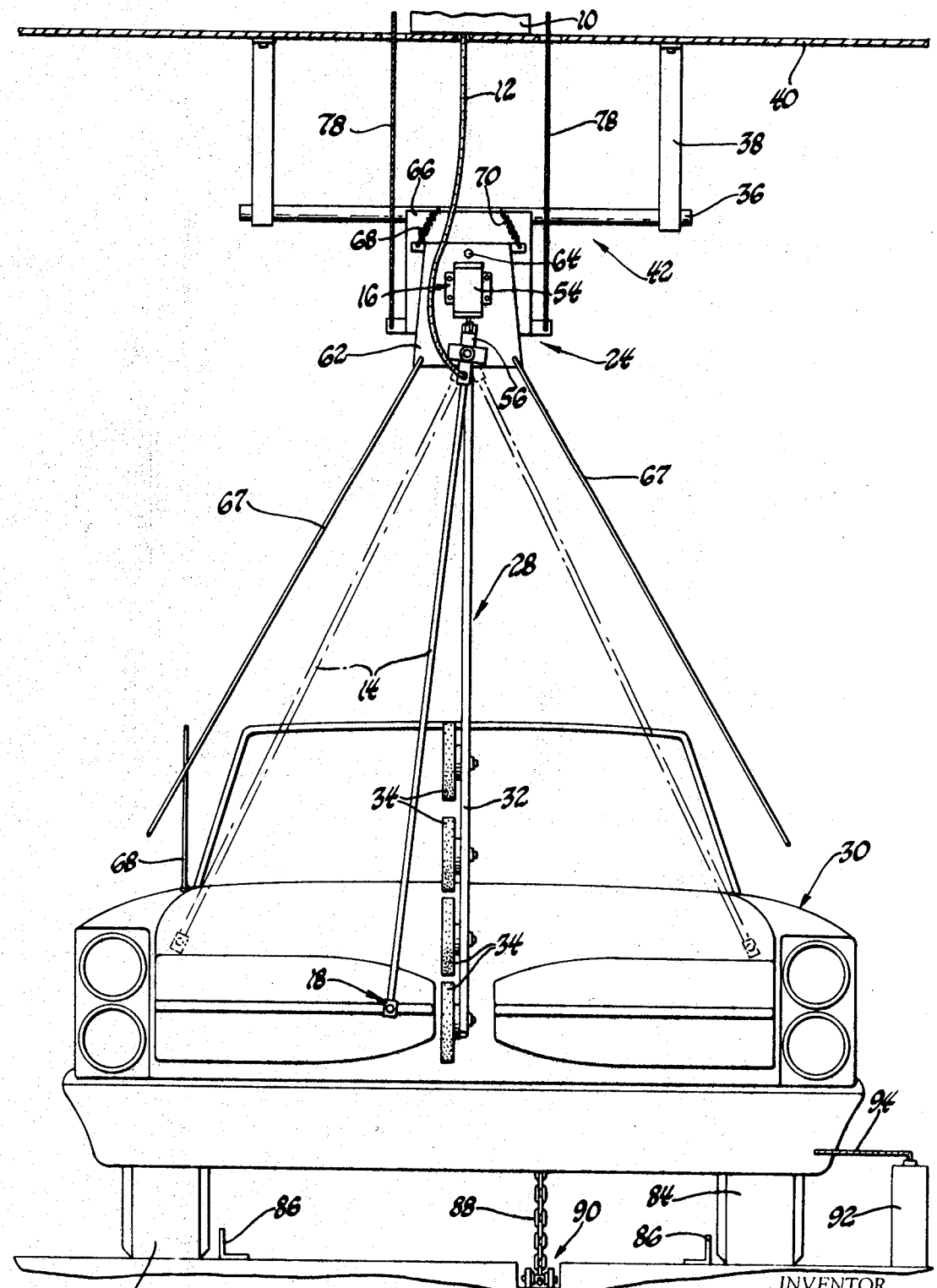
FIG. 2 is an elevational view of the embodiment of FIG. 1 shown in the direction in which the vehicle travels a car wash.

Referring to FIG. 2, second means 24 includes means for pivoting the first means, which is generally designated by numeral 28, transversely of a vehicle 30. First means 28 includes the spray device 18, previously described, including first nozzle means 20 and a second nozzle means 22. First nozzle means 20, as previously stated, is directed rearwardly toward a moving vehicle, and second nozzle means 22 is directed forwardly toward the moving vehicle. First nozzle means 20 is initially operatively positioned by the force of the moving vehicle acting on an arm 32 carrying wheels 34. Wheels 34 have a rubber coating or cover, such as rubber tires, and are adapted to contact the outer surface of a vehicle 30 to pivot second means 24 about a pivot bar 36. In this embodiment of the present invention, pivot bar 36, a support 38 and an overhead support 40 collectively comprise third means for supporting the entire assembly and is generally designated by numeral 42.

Figure 3:
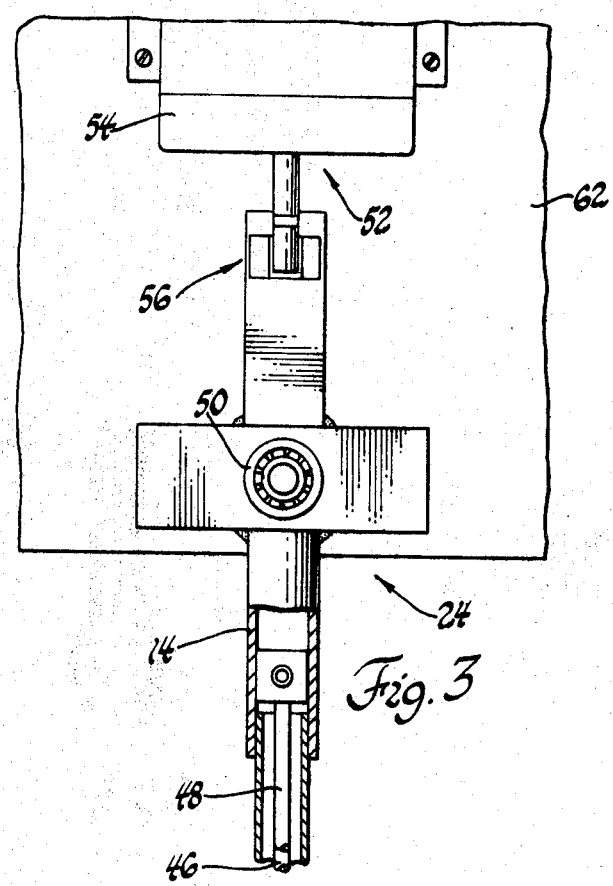
FIG. 3 is an enlarged elevational view of a portion of the subject invention with parts broken away illustrating the mechanism for oscillating the first means laterally with respect to the vehicle.

Referring to FIG. 3, arm 14 also acts as a nozzle housing and covers a plurality of pipes 46 and 48 establishing a path for fluid communication to fist nozzle means 20 and second nozzle means 22 respectively. Arm 14 pivots about bearing 50 in response to a motion created by translational movement generating means 52. Translational movement generating means 52 generally comprises a motor 54, which can be electric or hydraulic, and a crank mechanism generally designated by numeral 56. Crank mechanism 56 is more clearly seen in FIG. 4 and comprises crank arm member 58 and a cooperating slotted element 60 extending from bearing 50. Therefore, when motor 54 rotates, crank arm 58 likewise rotates driving element 60 to and fro around bearing 50 resulting in a pivoting of arm 14 transversely of vehicle 30. Therefore, the first means comprising arm 14 and spray device 18 extending from plate 62, and second means 24, swings to and fro, and causes a high-pressure stream of cleaning fluid from reservoir 10 to impinge upon the outer surface of vehicle 30.

Referring to FIG. 2, plate 62 is pivotable about point 64 with respect to relatively fixed plate 66 within the limits allowed by springs 68 and 70. Therefore, when motor 54 rotates and crank arm 58 drives arm 14 transversely with respect to the longitudinal axis of vehicle 30, a certain amount of overtravel is possible at the extremes of movement. Outrigger means 67 are attached to plate 62 and are adapted to contact the vehicle's radio antenna to limit the lateral movement of second means 24. This is brought about by a rotation of plate 62 responding to outrigger means 67 being deflected by antenna 68, for example. If outrigger means 67 does not contact antenna 68, the force of the rotational motor 54 driving crank 56 can cause nozzle housing 14 to overtravel slightly, which motion is absorbed by springs 68 or 70 depending on the direction of rotation of arm 14 around bearing 50. This will effectively prevent overtravel of arm 14, maintaining the spray, emanating from first nozzle means 20 or second means 22, depending on which nozzle means is operating, directed at vehicle 30.

It should be understood that arm 32 is secured to plate 66 of second means 24 and is in turn pivotable with respect to third means 42. Wheels 34, carried rotatably on arm 32, roll over the top of vehicle 30 as it passes by the vehicle cleaning apparatus thereby keeping the spray nozzles in proximity to each portion of the top of the vehicle as the wheels 34 roll thereacross. Arm 32 will eventually drop off the trunk of vehicle 30 continuing the spray at the vehicle rear end for a period of time and will follow vehicle 30 through the car wash apparatus in a manner to be hereinafter described.

Referring to FIG. 2, third means 42 generally comprises support 38 carried by overhead support 40. Weight 76 is attached to cables 78, the cables 78 being attached at their opposite end to second means 24. Weight 76 is chosen so that the major portion of the collective weight of first means 28, and second means 24 is balanced. Plate 66, to which arm 32 is attached, is pivotable about bar 36 which in turn is carried by support 38.

Figure 4:
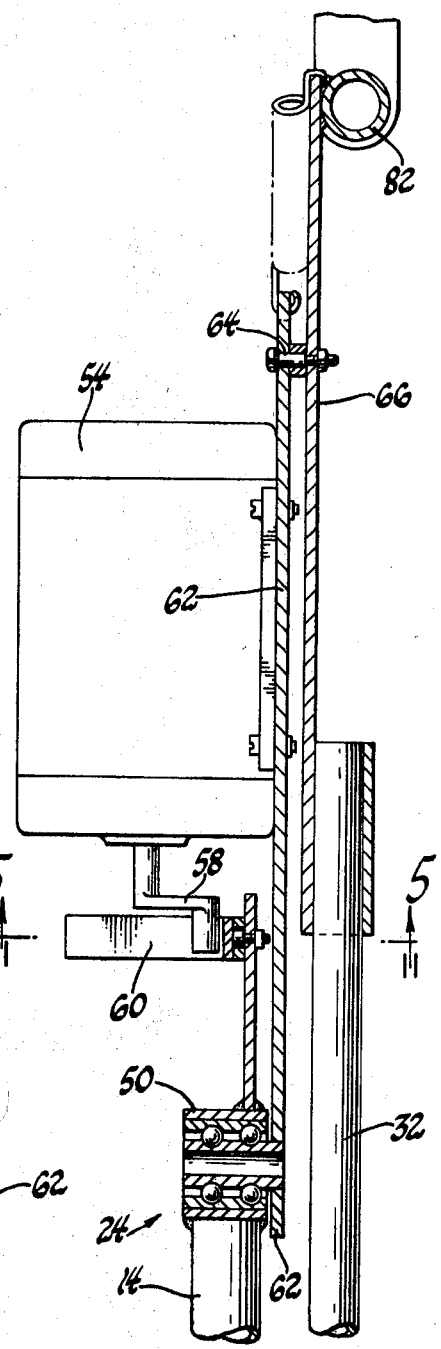
FIG. 4 is a sectional view of the mechanism shown in FIG. 3.

This relationship of parts is also seen in FIG. 4.

In operation, vehicle 30 enters the area where the car washing is to take place, and tires 84 are located by flanges 86 on the floor of the car wash. Referring to FIG. 1, pull chain arrangement 88 is attached at one end to a conveyor generally designated by numeral 90 and at an opposite end to the frame structure underneath vehicle 30. Vehicle 30 is unpowered at this juncture and is, therefore, able to be towed through the car wash. It will be understood that a typical car wash comprises a series of washing and cleaning stations situated on either side and on top of an elongated cleaning area. Flanges 86 are guides that extend throughout the car wash cleaning area, and conveyor 90 likewise extends throughout the length thereof.

When vehicle 30 reaches a predetermined point, limit switch assembly 92 including arm 94 is contacted by the front end of vehicle 30 which turns on a pressure source, not shown, which causes a mixture of water and detergent to flow from reservoir 10 through line 12 to nozzle means 20 causing a spray of water to be emitted therefrom. Wheels 34, as previously described, are covered by some type of rubber or plastic material and contact the front end of the vehicle. Therefore, as vehicle 30 advances through the car wash cleaning area, arm 32 and second means 24 are pivoted upwardly. Contemporaneous with the energization of the spray device 18, motor 54 is energized and commences the pivoting of arm 14 about bearing 50 by means of the crank action previously described and illustrated in FIG. 4. Therefore, arm 14 carrying the second nozzle means 20 also moves to and fro with respect to the longitudinal axis of the vehicle 30 in the manner illustrated in FIG. 2.

Wheels 34 contact the upper surfaces of vehicle 30 as vehicle 30 is drawn past fixed support 38. The angular relationship of the vehicle cleaning apparatus will vary depending on the height of the car as the wheels 34 pivot the assembly in response to wheels 34 contacting the vehicle's outer surface thereby sensing the shape of the outer contour thereof. First nozzle means 20 continually sprays a combination of water and detergent under high pressure toward the surface of the vehicle and its angular position varies as described in response to the contacting of the outer surfaces of the vehicle by wheels 34.

When the vehicle has passed the point of fixed support 38 and the lowest of the wheels 34 is contacting the trunk of vehicle 30, the nozzle means 20 is still in operation. But as the wheels 34 drop from the trunk of the vehicle, means 26, which is a door-closer-type device acts in conjunction with counterweight 76, first slows and then arrests the downward movement of the arm 14 around the pivot bar 36. A predetermined amount of motion takes place in a downwardly pivoting direction and then a switch 96 is engaged by plate 66 and serves two functions. First, the arm's downwardly pivoting movement is arrested so that it assumes an angle wherein second nozzle means 22 is directed at the rear portion of the vehicle and this angular relationship is maintained. Secondly, limit switch 96, when completely actuated, serves the function of actuating a solenoid valve 98 and switches the stream of water and detergent from line 100 to line 102, these lines being clearly seen in FIG. 6. Thereafter, water and detergent under high pressure emanate from second nozzle means 22 instead of first nozzle means 20 and spray the underside and rear of the vehicle as it passes away from this washing station. At a predetermined time, a second limit switch assembly, similar to 92 but not shown, is released by an appropriate point on the vehicle, previously contacted, turning off the pressure stream of water and detergent and readying the device for another cycle.

Figure 7:
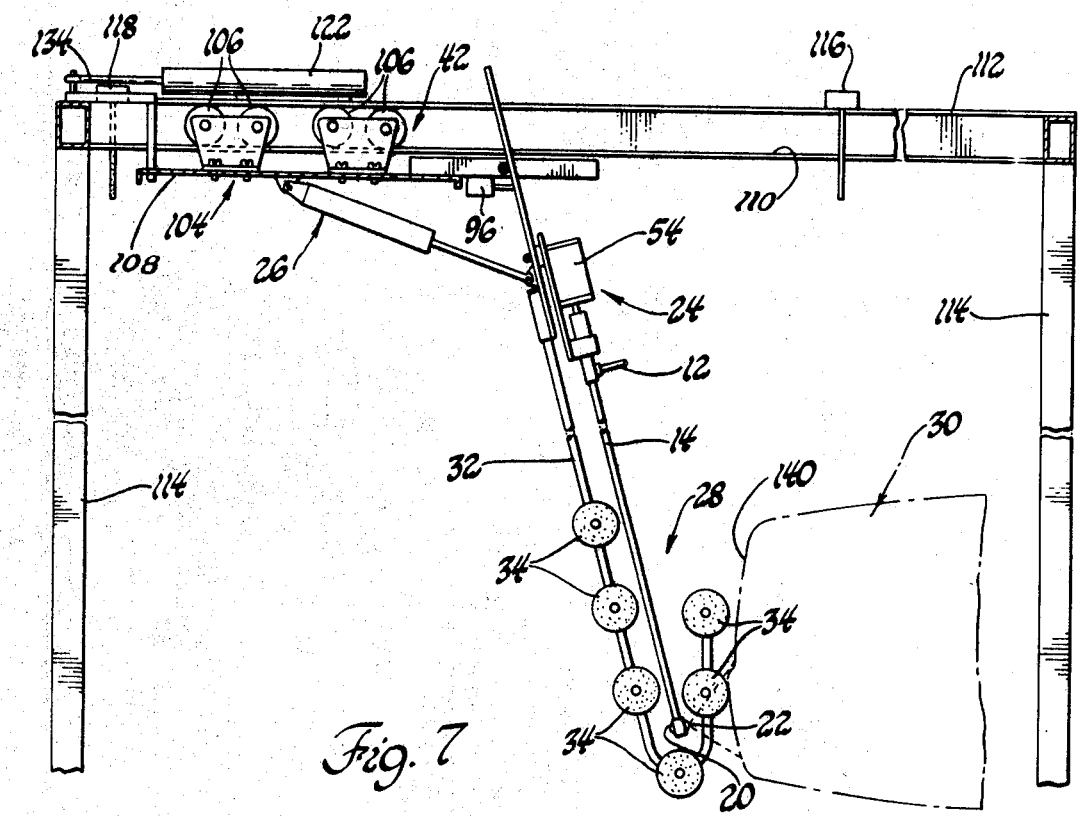
FIG. 7 is an elevational view of another embodiment of the present invention.

Referring to FIG. 7, another embodiment of the present invention is shown in which second means 24 oscillates first means 28 in the manner previously described but third means 42 includes means for moving the second means rectilinearly in a longitudinal direction with respect to the vehicle. The common parts shown in the second embodiment relative to the first embodiment are given the same reference numerals.

Specifically, the operation of the first and second means is the same as shown in the first embodiment with only minor modifications but the third means, instead of being fixed as in the first embodiment, is shown as being mounted on a trolley 104. Trolley 104 generally comprises a series of wheels 106 carrying a fixed plate or support member 108. Wheels 106 carry support member 108 rectilinearly or in a straight line which is parallel with respect to the longitudinal axis of a vehicle to be washed. Wheels 106 roll along flange 110 of an overhead support beam 112 supported from the floor of the car wash by support beams 114.

Figure 8:
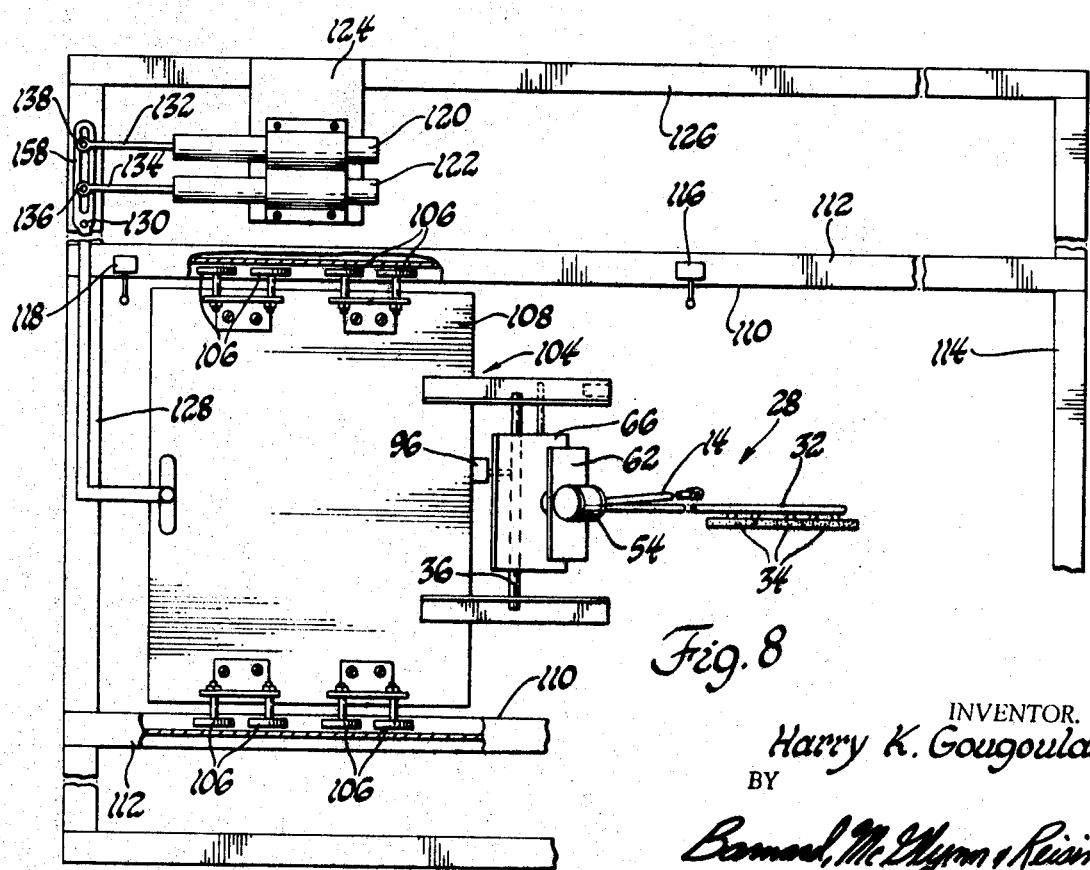
FIG. 8 is a plan view of the embodiment of FIG. 7.

Trolley 104 is normally situated in a centered manner with respect to limit switches 116 and 118, it being shown in FIGS. 7 and 8 near the rearward extreme of movement. Limit switches 116 and 118 respectively control air cylinders 120 and 122 and are carried by fixed plate 124, in turn carried by beam 126. Drive arm 128 engages the rear end of plate or support member 108 and is driven around pivot point 130 by output arms 132 and 134. Cylinder 122 and output arm 134 operate through pivot 136 which is a given distance from pivot point 130 as seen in FIG. 8. Output arm 132 operates through pivot 138 which is a greater distance from pivot point 130. Therefore, a similar motion of arms 132 and 134 will have a different effect on the amount of distance trolley 104 moves.

In operation, the vehicle 30 travels into the car wash in much the same manner as described in the previous embodiment, and it can be assumed that the conveying apparatus and switching apparatus is similar to that shown in the embodiment of FIGS. 1 through 6. Also, it should be noted that trolley 104 is normally centered with respect to limit switches 116 and 118 and typically limit switches 116 and 118 are approximately 6 feet apart. It should also be noted that first means 28 extends downwardly from pivot bar 36 so that first means 28 is approximately vertical with respect to the floor of the car wash at the start of the cycle. As the front of vehicle 30 strikes wheels 34, two motions are generated. Arm 32 is pivoted progressively upwardly while at the same time, due to the weight of the assembly, suspended from trolley 104, trolley 104 is pushed toward limit switch 116. Limit switch arrangements such as shown in FIG. 1 and indicated by numeral 92 with extending arm 94 cause the water and detergent solution, under pressure, to be switched on in any well known manner while at the same time motor 54 is actuated causing nozzle housing 14 to oscillate to and fro in the same manner as shown in FIG. 2. However, it should be pointed out that in FIGS. 7 and 8, in the interest of clarity, second means 24 is more diagrammatically shown, and the details of the spring arrangements 68 and 70 as well as outriggers 67 are not shown, although it is understood they can be incorporated into the embodiment of FIGS. 7 and 8.

When trolley 104 is pushed forwardly to a point where the limit switch 116 is actuated, air cylinder 122 is energized through a solenoid valve previously described, which causes trolley 104 to be pushed toward limit switch 118 by the interconnections of output arm 134 and arm 128 acting about pivot point 130. As previously stated, the travel distance between limit switch 116 and 118 is approximately 6 feet and it should be understood that vehicle 30 is moving in the opposite direction. Cylinder 122 is a slowly moving cylinder and the timing is such that cylinder 122 is completely expanded at approximately the time that one of the wheels 34 is dropping off the edge of trunk 140 of vehicle 30. Further, in practice, limit switch 118 is in series with limit switch 96 so that cylinder 120 is not actuated until arm 32 is appropriately positioned as hereinafter described. As in the previous embodiment, door closer 26 cushions the shock of first means 28 dropping off trunk 140 of the vehicle and moves it downwardly slowly until the limit switch 96 is actuated. The cylinder shown at 26 can be either powered or unpowered depending on the desired design of the system but the basic function of cylinder 26 is twofold. First, to slow the downward movement of first means 28 and secondarily, to position first means 28 so that second nozzle means 22, when actuated, will be disposed at a level approximately even with the bumper of vehicle 30.

Therefore, when air cylinder 122 is extended fully, limit switch 118 is energized, and assuming limit switch 96 is energized, solenoid valve 98 is actuated to switch the stream of high-pressure water and detergent mixture from the first nozzle means 20 to second nozzle means 22 while at the same time air cylinder 120 is energized so that when it is fully extended, the link between output arm 132, pivot 138, pivot 130 and arm 128 drives trolley 104 back to a centered position with respect to limit switches 116 and 118. When this position is achieved, another limit switch such as the one at 92 in FIG. 1 is actuated by the car passing the area where it is to be washed, and this allows first means 28 to drop into a vertical position with respect to beam 112 readying it for another cycle of operation. It should be noted that door closer cylinder 26, if powered, is merely deactuated so that it will slowly move down to a vertical position against its inherent bias and the limit switch that is energized by the vehicle passing beyond an output arm likewise deenergizes three-way solenoid valve 98 to cease the flow of high-pressure water and detergent.

Figure 9:
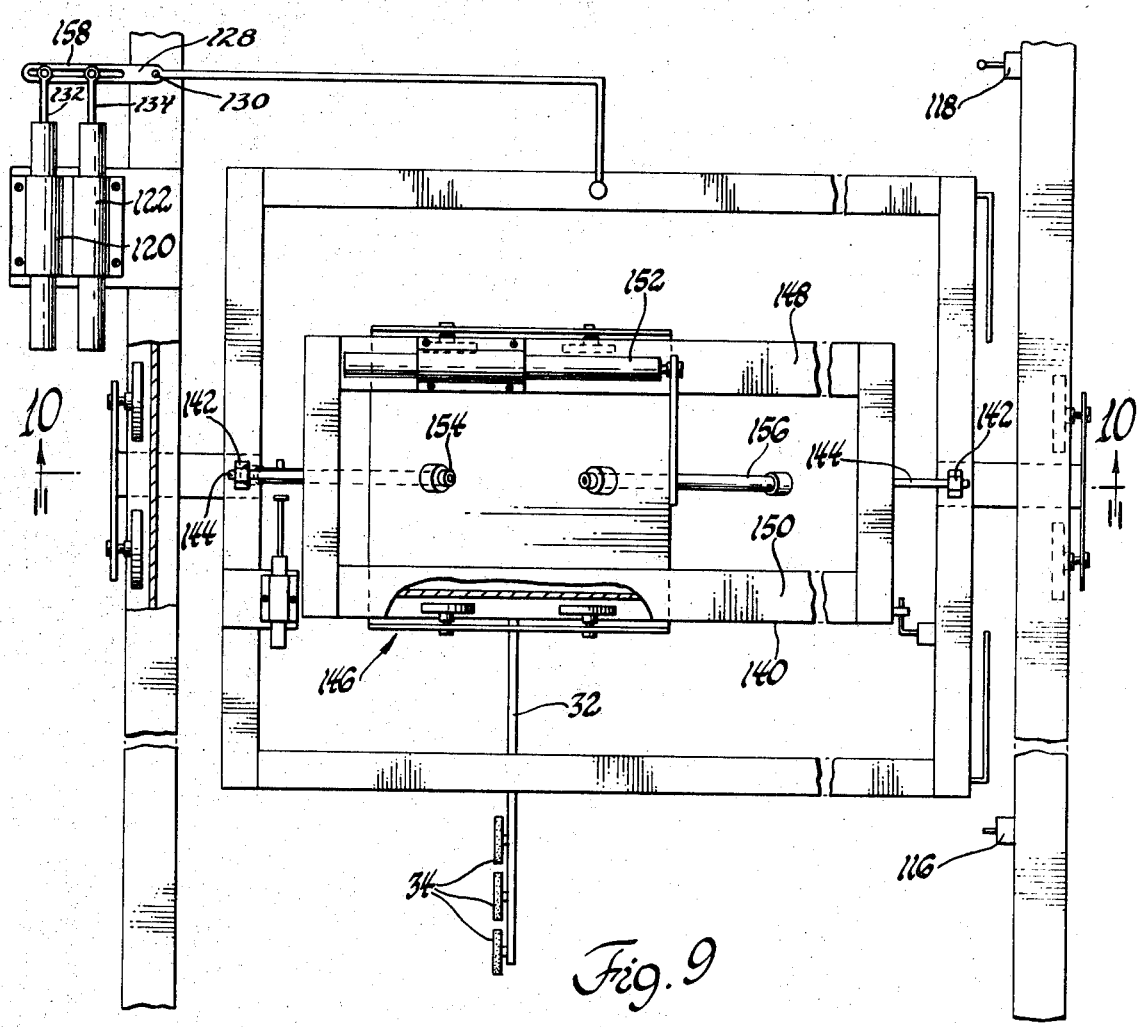
FIG. 9 is a plan view of another embodiment of the present invention illustrating a two-nozzle arrangement.
Figure 10:
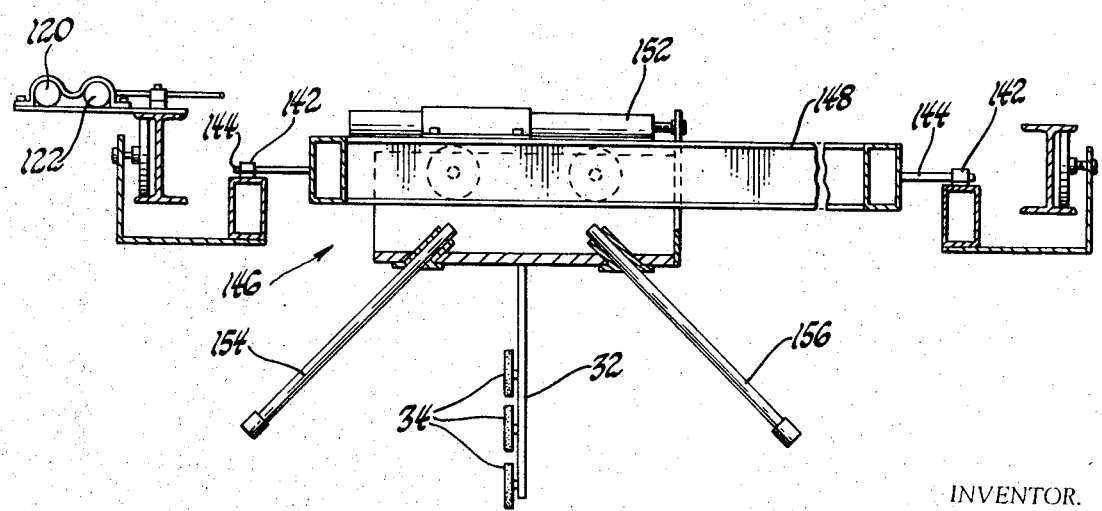
FIG. 10 is a sectional view taken along line 10–10 of FIG. 9.

Referring to FIGS. 9 and 10, another embodiment of the present invention is shown which is very similar to the second embodiment but which incorporates means substituting for second means 24, as previously described. In other words, arm 32 and wheels 34 are fixedly attached to member 140 which is the equivalent of fixed plate 66 in that member 140 pivots about bearings 142 by means of shafts 144 connected to member 140. Member 140 is essentially an oblong structure comprised of I beams that are welded together to form a frame. Trolley 146 travels back and forth on the lower flanges of beams 148 and 150 by virtue of a force generated by air cylinder 152. Air cylinder 152 is again typically operated by a solenoid valve and is a two-way cylinder; that is, is powered while both extending and retracting so that trolley 146 is oscillated transversely with respect to a vehicle to be cleaned.

Referring to FIG. 10, arms 14 of previous embodiments have been replaced by arms 154 and 156, respectively. Arms 154 and 156 diverge and are, therefore, angularly disposed with respect to trolley 146 so that the first and second nozzle means disposed on the ends thereof are spaced so as to extend approximately halfway across the vehicle. For this reason, air cylinder 152 need only move trolley 146 half the distance of the width of a vehicle in order to insure that the complete lateral width of the vehicle is exposed to the high-pressure spray from the nozzle means carried by arms 154 and 156. 128 pivotally. Trolley 146 has a similar slot engaging arm 128. The The operation of this third embodiment is exactly the same as the operation of the second embodiment but for the change from an oscillating swinging nozzle assembly to a nozzle assembly shown in this embodiment carried by trolley 146 and driven in a oscillating manner by air cylinder 152. Also, it will be noted in the embodiment of FIG. 9, which is also seen in the embodiment of FIG. 8, that there is a slot in arm 128 which is adapted to accommodate the arcuate movement of arm 128 around pivot 130 as output arms 132 and 134 of air cylinders 120 and 122 respectively drive arm 128 pivotally. Trolley 146 has a similar slot engaging arm 128. The slot is designated by numeral 158.

Referring to FIG. 11, side spray fluid pressure means 160 are also shown which oscillate nozzles vertically with respect to the side of a vehicle. It is understood that identical units with an opposite pivot direction are shown for opposite sides of the vehicle but only one unit will be described. Members 162 and 164, connected by crossmember 166, pivot on bearing assemblies 168 and 170 carried by vertical support 171. Arm 172, carrying wheels 174, is fixed to crossmember 166. Wheels 174 are adapted to contact the side of vehicle 30 to be cleaned. Air cylinder 176 is a two-way cylinder and is carried on support 179 which is in turn fixed to members 162 and 164. Slide 178 is movable with output member 181 of cylinder 176 on support 179. Pivot linkage 180 is connected to member 181 and to slides 182 and 184 carrying nozzles 183 and 185 respectively. Slides 182 and 184 move on guide means 186 that is arcuate in shape generally conforming in its arc to the side shape of a vehicle. Therefore, when cylinder 176 is alternately extended and retracted, slides 182 and 184 move nozzles 183 and 185 in an oscillating manner with respect to the vehicle's side as positioned by wheels 174 and guided by arcuate guide means 186.

In operation, vehicle 30 is drawn through a car wash area in the same manner as previously described for the top spray apparatus. The side spray assembly 160 is biased toward a fully extended position by springs or a slight tilt in its mounting so that gravity causes the assembly to be poised in an extended position. The moving vehicle strikes extended wheels 174, that are rubber covered, for example, and pivots the entire assembly on bearings 168 and 170 into door-closer-type cylinder 188 which prevents any bouncing of the assembly. A limit switch is struck by the vehicle, such as shown at 92 in FIG. 2, and starts the water and detergent through nozzles 183 and 185 and also actuates cylinder 176 through a well known solenoid valve, not shown. Wheels 174, therefore, locate the nozzles 183 and 185 with respect to the side of a vehicle and senses the width thereof. The nozzles oscillate up and down guide means 186 until the wheels drop off the rear end of the vehicle contemporaneous with the vehicle actuating another switch such as 92. The whole assembly moves toward an extended poised position and door-closer cylinder controls the speed of its return. The limit switch shuts off the water and detergent flow and also inactivates cylinder 176, and the assembly is ready for another cycle of operation.

It should be understood that the described side spray assembly can work in conjunction with any of the embodiments of the top spray assembly, previously described, or can work alone, if desired, in a given installation. In all cases, simple limit switches and solenoid valves control the on and off function of the spray nozzles and cylinders.

Therefore, in summary the present invention presents novel means for applying water and detergent to all surfaces of vehicle under high pressure to facilitate the cleaning of the vehicle surface by other means, such as by brushes in a car wash. The basic problem of applying high-pressure water and detergent is solved by the present invention in the manner previously described.

In each of the embodiments of the top spray apparatus, a nozzle is provided which has first and second outlets which are adapted to provide a high-pressure stream cleaning fluid to a vehicle's outer surface, means for oscillating the nozzle transversely with respect to the longitudinal axis of the vehicle is also provided, while finally means are provided for moving the oscillating nozzles rectilinearly on a line parallel to the longitudinal axis of the vehicle to guarantee that all surfaces of the vehicle are subjected to the high-pressure stream of water and detergent. Thus, it is emphasized that the ability of the present invention to provide a high-pressure stream of the water and detergent both to the underside of the front of the vehicle and the underside of the rear of the vehicle for a controlled time period is a feature that is not found in the art. The cost of providing the oscillating nozzles of the present invention, depending on which form is used in a given installation, is minimal with respect to the cost of providing a high-pressure stream of water and detergent in a manner previously known. This is true both because of the amount of the coverage of the vehicle given with a particular amount of water and detergent as well as because of the relative simplicity of the device enabling its construction by use of simple structural members currently available without resorting to sophisticated apparatus.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. Vehicle cleaning apparatus comprising: first means including selectively operable nozzle means adapted to provide a high-pressure stream of cleaning fluid to a vehicle's outer surface; second means for oscillating said first means transversely with respect to the longitudinal axis of the vehicle; and third means for moving said second means in a longitudinal direction with respect to the vehicle; and control means including a pair of fluid-operated cylinders adapted to selectively move said third means from a longitudinally forward limit of movement to a longitudinally rearward limit of movement and then forward from said rearward limit of movement to an intermediate poised position.

2. Vehicle cleaning apparatus according to claim 1 and further including means for oscillating a high-pressure stream of cleaning fluid vertically with respect to the side of a vehicle.

3. Vehicle cleaning apparatus according to claim 2 wherein said oscillating means includes drive means for oscillating a plurality of nozzles vertically with respect to the vehicle being cleaned.

4. Vehicle cleaning apparatus according to claim 3 wherein said drive means is a fluid cylinder.

5. Vehicle cleaning apparatus according to claim 4 wherein said plurality of nozzles are guided in their vertical travel by a contoured member extending upwardly from the ground in substantial parallelism with respect to the side of a vehicle being cleaned.

6. Vehicle cleaning apparatus according to claim 1 wherein said first means includes a spray device.

7. Vehicle cleaning apparatus according to claim 6 wherein said spray device includes a plurality of nozzles.

8. Vehicle cleaning apparatus according to claim 7 wherein said plurality of nozzles includes a first nozzle means directed rearwardly toward a moving vehicle and a second nozzle means directed forwardly toward a moving vehicle, said second means including means for selecting one of said nozzles for operation at different points of movement of the vehicle.

9. Vehicle cleaning apparatus according to claim 8 wherein said first nozzle means is initially operatively positioned by the force of a moving vehicle acting against said third means and is later positioned by a force created by said first means.

10. Vehicle cleaning apparatus according to claim 9 wherein said third means includes a fluid cylinder responding to a pivoting of said second means to hold said second means at a predetermined angle relative to said third means in the travel of said third means from a rearwardmost position to a poised position.

11. Vehicle cleaning apparatus according to claim 8 wherein said second nozzle means is operatively positioned in sequence after said first nozzle means by said first and second means so that said third means moves from a poised position forwardly a predetermined distance, then moves backward past the position to the rear thereof, and finally is repositioned at the poised position.

12. Vehicle cleaning apparatus according to claim 1 wherein said second means includes means for pivoting said first means vertically with respect to a vehicle.

13. Vehicle cleaning apparatus according to claim 1 wherein said second means includes means for pivoting said first means transversely of the vehicle.

14. Vehicle cleaning apparatus according to claim 13 wherein said means includes an electric motor.

15. Vehicle cleaning apparatus according to claim 1 wherein said second means includes a trolley.

16. Vehicle cleaning apparatus according to claim 15 wherein said trolley is carried by a support that is movable with respect to said third means and a vehicle that is moving.

17. Vehicle cleaning apparatus according to claim 1 wherein said second means is fixed with respect to said third means.

18. Vehicle cleaning apparatus according to claim 1 wherein said second means includes means for sensing the configuration of a vehicle.

19. Vehicle cleaning apparatus according to claim 18 wherein said means includes an arm extending toward the vehicle, and roller means mounted thereon adapted to contact the vehicle.

20. Vehicle cleaning apparatus according to claim 19 wherein said arm is supported by said second means in turn pivotable with respect to said third means, said roller means rolling over the top of a vehicle as it passes by the vehicle cleaning apparatus thereby keeping said first means in proximity to each portion of the top of the vehicle.

21. Vehicle cleaning apparatus according to claim 1 wherein second means for oscillation includes a rotatable means.

22. Vehicle cleaning apparatus according to claim 21 wherein said rotatable means includes a crank.

23. Vehicle cleaning apparatus according to claim 22 wherein said first means includes a member extending therefrom and engageable with said crank to swing said first means to and fro.

24. Vehicle cleaning apparatus according to claim 23 wherein said second means is pivotally supported by third means for pivoting both laterally of a vehicle and along the longitudinal axis thereof, said second means including a plate carrying said rotatable means and said first means, said plate being pivotal laterally of a vehicle when said crank swings said first means to two extremes of movement.

25. Vehicle cleaning apparatus according to claim 1 wherein said second means for oscillation includes a translational movement generating means.

26. Vehicle cleaning apparatus according to claim 25 wherein said translational movement generating means includes at least one air cylinder.

27. Vehicle cleaning apparatus according to claim 26 wherein said air cylinder is extendible and contractible to oscillate said first means in two directions from a centered position.

28. Vehicle cleaning apparatus according to claim 27 wherein said first means includes a pair of spaced nozzles mounted on a trolley of said second means, each of said nozzles having a forwardly and rearwardly directed outlet, said pair of spaced nozzles being driven in an oscillating manner transversely of a vehicle by an air cylinder mounted on a support pivotal with respect to a trolley of said third means.

29. Vehicle cleaning apparatus according to claim 1 wherein said third means carries said first means.

30. Vehicle cleaning apparatus according to claim 1 wherein said third means carries said first and second means.

31. Vehicle cleaning apparatus according to claim 30 wherein said third means includes a trolley movable along the longitudinal axis of a vehicle and said second means includes a trolley movable perpendicularly with respect to said third means, said first means being pivotable transversely with respect to said second means and with respect to the vehicle.

32. Vehicle cleaning apparatus according to claim 30 wherein said first means is fixed with respect to said second means.

33. Vehicle cleaning apparatus according to claim 1 wherein said third means includes a trolley.

34. Vehicle cleaning apparatus according to claim 1 wherein said pair of fluid cylinders are disposed in parallel and said third means includes a pivotable lever means acting against a rectilinearly movable trolley, a first cylinder of said pair being situated further from the pivot point of said lever than the second cylinder to induce more travel in said trolley than said first cylinder.